US011824786B2

United States Patent
Wheelock

(10) Patent No.: US 11,824,786 B2
(45) Date of Patent: Nov. 21, 2023

(54) DYNAMIC TRAFFIC HANDLING FOR LOW LATENCY TRAFFIC IN A LAYER 2 MODEM

(71) Applicant: ARRIS Enterprises LLC, Suwanee, GA (US)

(72) Inventor: Ian G Wheelock, Cork (IE)

(73) Assignee: ARRIS ENTERPRISES LLC, Suwanee, GA (US)

( * ) Notice: Subject to any disclaimer, the term of this patent is extended or adjusted under 35 U.S.C. 154(b) by 108 days.

(21) Appl. No.: 17/582,347

(22) Filed: Jan. 24, 2022

(65) Prior Publication Data
US 2022/0239599 A1 Jul. 28, 2022

Related U.S. Application Data

(60) Provisional application No. 63/141,083, filed on Jan. 25, 2021.

(51) Int. Cl.
| | |
|---|---|
| *H04L 47/2441* | (2022.01) |
| *H04L 47/2475* | (2022.01) |
| *H04L 47/56* | (2022.01) |
| *H04L 43/028* | (2022.01) |
| *H04L 49/351* | (2022.01) |

(52) U.S. Cl.
CPC ........ *H04L 47/2441* (2013.01); *H04L 43/028* (2013.01); *H04L 47/2475* (2013.01); *H04L 47/56* (2013.01); *H04L 49/351* (2013.01)

(58) Field of Classification Search
CPC . H04L 47/2441; H04L 47/2475; H04L 47/56; H04L 47/20; H04L 47/24; H04L 47/2416; H04L 47/2483; H04L 43/026; H04L 43/028; H04L 49/35; H04L 49/351
See application file for complete search history.

(56) References Cited

U.S. PATENT DOCUMENTS

| | | | |
|---|---|---|---|
| 2002/0065907 A1* | 5/2002 | Cloonan | H04L 41/5006 709/228 |
| 2005/0018651 A1 | 1/2005 | Yan et al. | |
| 2015/0172198 A1* | 6/2015 | Levy | H04L 47/24 370/232 |

(Continued)

OTHER PUBLICATIONS

International Search Report and the Written Opinion of the International Searching Authority dated Apr. 28, 2022 in International (PCT) Application No. PCT/US2022/013474.

(Continued)

*Primary Examiner* — Mohamed A Kamara
(74) *Attorney, Agent, or Firm* — Wenderoth, Lind & Ponack, L.L.P.

(57) ABSTRACT

A layer 2 (L2) modem provides traffic handling for low latency (LL) traffic. A filter is selected from an application traffic filter list. The filter determines LL traffic that is received and uses a DSC messaging process is used add a classifier for directing the LL traffic to the LL SF. If LL traffic associated with an LL traffic filter of the classifier begins to buildup in a queue, the LL traffic filter is removed from the classifier. This information is provided to a LL controller server that refines the application traffic filter list used to create the classifier. When LL traffic has not been received for a predetermined time, the classifier is removed. Once LL traffic is again detected by the L2 modem filters, a classifier is again added.

20 Claims, 4 Drawing Sheets

(56) References Cited

U.S. PATENT DOCUMENTS

| | | | |
|---|---|---|---|
| 2018/0006954 A1* | 1/2018 | Arora | H04W 4/24 |
| 2019/0097945 A1 | 3/2019 | Chapman et al. | |
| 2022/0272070 A1* | 8/2022 | Heo | H04L 49/90 |

OTHER PUBLICATIONS

International Preliminary Report on Patentability and Written Opinion dated Aug. 3, 2023 in International Application No. PCT/US2022/013474.

* cited by examiner

DYNAMIC TRAFFIC HANDLING FOR LOW LATENCY TRAFFIC IN A LAYER 2 MODEM

BACKGROUND

The subject matter of the present disclosure relates generally to providing dynamic traffic handling for low latency (LL) traffic in a layer 2 (L2) modem.

A NAT (Network Address Translation) table may be used by a traffic routing device to remap a source/destination IP address into a destination/source IP address. The NAT table is used to modify network address information in the IP header of packets while they are in transit across a traffic routing device. A packet includes a 5-tuple that identifies a UDP/TCP session and when a UDP/TCP session flows through a NAT. Each session has two different 5-tuples: one with IPv4 addresses and one with IPv6 addresses. For example, a 5-tuple may include a source IP address, a source port, a destination IP address, a destination port, and identification of the transport being used.

Thus, NAT may provide a scheme to deal with low latency traffic both for upstream and downstream traffic handling. This is suitable for a Layer 3 device, either in an integrated broadband gateway, or in a standalone gateway connected to a broadband layer 2 modem. However, where a standalone broadband layer 2 modem connects via Ethernet (or other link) to a standalone gateway (providing a router environment connecting Ethernet/Wi-Fi users), modification of the standalone gateway software may not be desirable and instead a layer 2 modem may be preferable. Thus, a method is needed to provide dynamic handling for LL traffic in a layer 2 modem.

SUMMARY

An aspect of the present disclosure involves controlling low latency traffic in a layer 2 modem.

A low latency (LL) layer 2 (L2) modem includes a memory that stores computer-readable instructions, and a processor configured to execute the computer-readable instructions to receive an application traffic filter list from a LL controller server, and configures at least one filter selected from the application traffic filter list for directing incoming traffic to a LL service flow (SF). Incoming traffic is received at the at least one filter, which is directed to a classic SF. LL traffic from the incoming traffic received at the at least one filter is identified. Based on identifying the LL traffic received by the at least one filter, a Dynamic Service Change (DSC) request is sent to a broadband access gateway to add a classifier with one or more LL traffic filters for directing the LL traffic to a LL SF. The L2 modem receives a DSC response from the broadband access gateway to add the classifier having the one or more LL traffic filters for directing the LL traffic to the LL SF. The incoming traffic is processed using the classifier by determining incoming traffic that matches parameters of the one or more LL traffic filters and the incoming traffic that matches the parameters of the one or more LL traffic filters is directed to the LL SF.

The processor receives an LL application description from the LL controller server, wherein the LL application description includes the application traffic filter list.

The processor is further configured to identify the incoming traffic processed by the one or more LL traffic filters of the classifier that begins to buildup in a queue for the LL SF, determine at least one of the one or more LL traffic filters associated with the incoming traffic that begins to buildup in the queue for the LL SF, and remove, from the classifier, the at least one of the one or more LL traffic filters associated with the incoming traffic that begins to buildup in the queue for the LL SF.

The processor is further configured to send, to the LL controller server, an identification of the at least one of the one or more LL traffic filters associated with the incoming traffic that begins to buildup in the queue for the LL SF to refine the application traffic filter list.

The processor implements machine learning to identify a 5-tuple of the incoming traffic determined to match the parameters of the one or more LL traffic filters, wherein the 5-tuple of the incoming traffic determined to match the parameters of the one or more LL traffic filters is used as the identification of the at least one of the one or more LL traffic filters associated with the incoming traffic that begins to buildup in the queue for the LL SF.

The processor is further configured to determine that the LL traffic has not been received by the classifier for a predetermined time, and, based on determining that the LL traffic has not been received by the classifier for the predetermined time, remove the classifier.

The processor is further configured to, after the classifier has been remove, begin to detect the LL traffic being received at the at least one filter, based on detecting the LL traffic being received by the at least one filter after the classifier has been removed, send a second Dynamic Service Change (DSC) request to the broadband access gateway to add the classifier with one or more LL traffic filters for directing the LL traffic to the LL SF, receive a second DSC response from the broadband access gateway to add the classifier having the one or more LL traffic filters for directing the LL traffic to the LL SF, and process the incoming traffic using the classifier by determining incoming traffic that matches parameters of the one or more LL traffic filters and directing the incoming traffic that matches the parameters of the one or more LL traffic filters to the LL SF.

BRIEF SUMMARY OF THE DRAWINGS

The accompanying drawings, which are incorporated in and form a part of the specification, illustrate examples of the subject matter of the present disclosure and, together with the description, serve to explain the principles of the present disclosure. In the drawings.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness.

Aspects of the present disclosure are directed to providing dynamic traffic handling for low latency traffic in a layer 2 (L2) modem.

Figure 1:
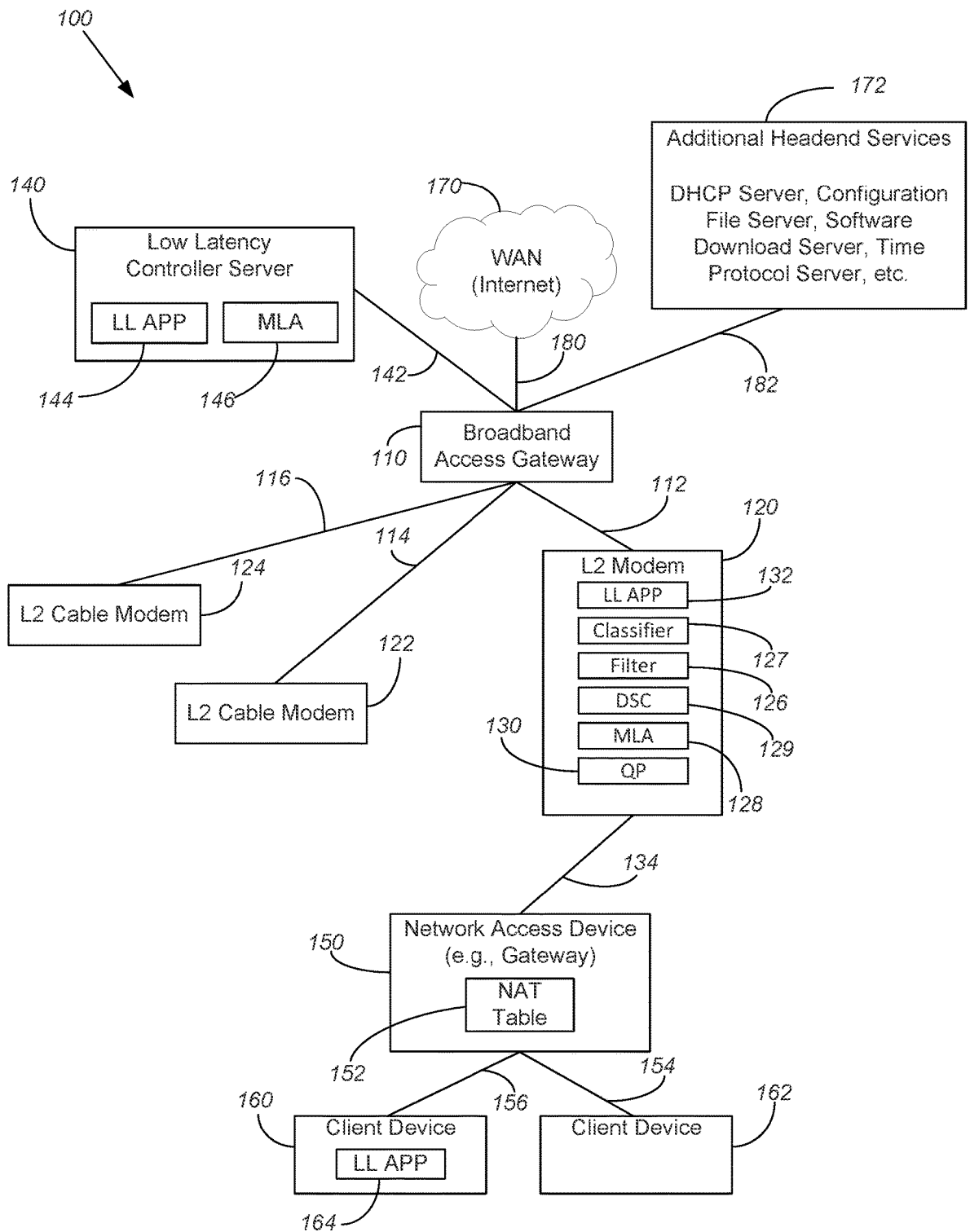
FIG. 1 is a schematic diagram of a system.

FIG. 1 is a schematic diagram of a System 100.

As shown in FIG. 1, the elements of the System 100 includes a Broadband Access Gateway 110, at least one Layer 2 (L2) Modem 120, 122, 124, a low latency (LL) Controller Server 140, a Network Access Device (e.g., a Gateway) 150, and Client Devices 160, 162. Broadband Access Gateway 110 provides high speed data services, such as access to the Internet 170 or other headend service 172. Broadband Access Gateway 110 may support access technologies such as Data Over Cable Service Interface Specification (DOCSIS), Digital Subscriber Line (DSL), Fiber-To-The-(Premises/Home/Building/Cabinet or Node) (generalized as FTTX) network using Passive Optical Network (PON) technology, etc. Different network elements are associated with the respective access technologies, such as Cable Modem Termination System (CMTS) and Cable Modem for DOC SIS cable services, and Optical Line Terminal (OLT) and Optical Line Terminators (OLT), Optical Distribution Network (ODN) devices, and Optical Network Units (ONU) for PON. DOCSIS provisioning systems may also be used to configure and manage fiber-based equipment in the same manner it is used to configure and manage DOCSIS cable modems. However, herein the terms LL Controller Server 140, Broadband Access Gateway 110, and L2 Modems 120, 122, 124 will be used to describe the disclosure.

L2 Modems 120, 122, 124 are home devices that provide a type of network bridge for bi-directional data communication between the Broadband Access Gateway 110 and Network Access Device 150. L2 Modems 120, 122, 124 may be similarly configured, although only L2 Modem 120 shows Filter 126, Classifier 127, Machine Learning Algorithm (MLA) 128, Dynamic Service Change (DSC) messenger 129, Queue Protection (QP) 130, and LL APP 132. The LL Controller Server 140 identifies LL flows for different applications and provides the selectable application traffic filter list to a User LL APP 164 and the LL APP 132 at the L2 Modem 120. The LL Controller Server 140 identifies LL flows for different applications and provides the selectable application traffic filter list to, for example, a User LL APP 164 at Client Device 150 and to the L2 Modem 120. Network Access Device 150 provides connectivity to a home network via either Wi-Fi or Ethernet. Network Access Device 150 may also include a NAT Table 152 that is used to modify network address information in the IP header of packets while they are in transit across a traffic routing device.

Broadband Access Gateway 110 is connected to LL Controller Server 140, Internet 170 and Headend Services 172 by Connections 142, 180, 182. L2 Modems 120, 122, 124 are connected to Broadband Access Gateway 110 by Connections 112, 114, 116. Connections 112, 114, 116, 142, 180, 182 can be implemented using a wide area network (WAN), a virtual private network (VPN), metropolitan area networks (MANs), system area networks (SANs), a DOCSIS network, a fiber optics network (e.g., FTTP (fiber to the premises), FTTH (fiber to the home), FFTB (fiber to the building), and FTTC/N (fiber to the cabinet/node), which may be generalized as FTTX (fiber to the x), or hybrid fiber-coaxial (HFC)), a digital subscriber line (DSL), a public switched data network (PSDN), a global Telex network, or a 2G, 3G, 4G or 5G network, for example. Connections 112, 114, 116, 142, 180, 182 can further include as some portion thereof a broadband mobile phone network connection, an optical network connection, or other similar connections. For example, Connections 112, 114, 116, 142, 180, 182 can also be implemented using a fixed wireless connection that operates in accordance with, but is not limited to, 3rd Generation Partnership Project (3GPP) Long Term Evolution (LTE) or 5G protocols. It is also contemplated by the present disclosure that Connection 180 is capable of providing connections between Broadband Access Gateway 110 and a WAN, a LAN, a VPN, MANs, PANs, WLANs, SANs, a DOCSIS network, a fiber optics network (e.g., FTTX, or HFC), a PSDN, a global Telex network, or a 2G, 3G, 4G or 5G network, for example. LL Controller Server 140 communicates with L2 Modems 120, 122, 124 via a logical connection through Broadband Access Gateway 110.

L2 Modem 120 is connected to Network Access Device 150 by Connection 134. Connection 134 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, 60 GHz, etc. Additionally, Connection 134 can be implemented using a wireless connection that operates in accordance with, but is not limited to, RF4CE protocol, ZigBee protocol, Z-Wave protocol, or IEEE 802.15.4 protocol. It is also contemplated by the present disclosure that Connections 134 can include connections to a media over coax (MoCA) network. Connection 134 can also be a wired connection, such as Ethernet. Additionally, Connection 134 can also be implemented through a WAN, a LAN, a VPN, MANs, PANs, WLANs, SANs, a DOCSIS network, a fiber optics network (e.g., FTTX, or HFC), a PSDN, a global Telex network, or a 2G, 3G, 4G or 5G network, for example.

Network Access Device 150 is connected to Client Devices 160, 162 by Connections 154, 156. Connections 154, 156 may be implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, 60 GHz, etc. Additionally, Connections 154, 156 can be implemented using a wireless connection that operates in accordance with, but is not limited to, RF4CE protocol, ZigBee protocol, Z-Wave protocol, or IEEE 802.15.4 protocol. Also, one or more of Connections 154, 156 can be a wired Ethernet connection.

Client Devices 160, 162 may be connected in one or more wireless networks (e.g., private, guest, iControl, backhaul network, or Internet of things (IoT) network) within the System 100. Additionally, there could be some overlap between Client Devices 160, 162 and Network Access Device 150 in different networks. That is, one or more Network Access Devices 150 could be located in more than one network. For example, one or more of Client Devices 160, 162 and Network Access Device 150 could be located both in a private network, and also included in a backhaul network or an iControl network.

Client Devices 160, 162 may be, for example, hand-held computing devices, personal computers, electronic tablets, smart phones, smart speakers, IoT devices, iControl devices, portable music players with smart capabilities capable of connecting to the Internet, cellular networks, and interconnecting with Network Access Device 150 via Wi-Fi and Bluetooth. Additionally, Client Devices 160, 162, can be a TV, an IP/QAM STB or an SMD that is capable of decoding audio/video content, and playing over-the-top (OTT) or MSO provided content received from the Broadband Access Gateway 110.

Figure 2:
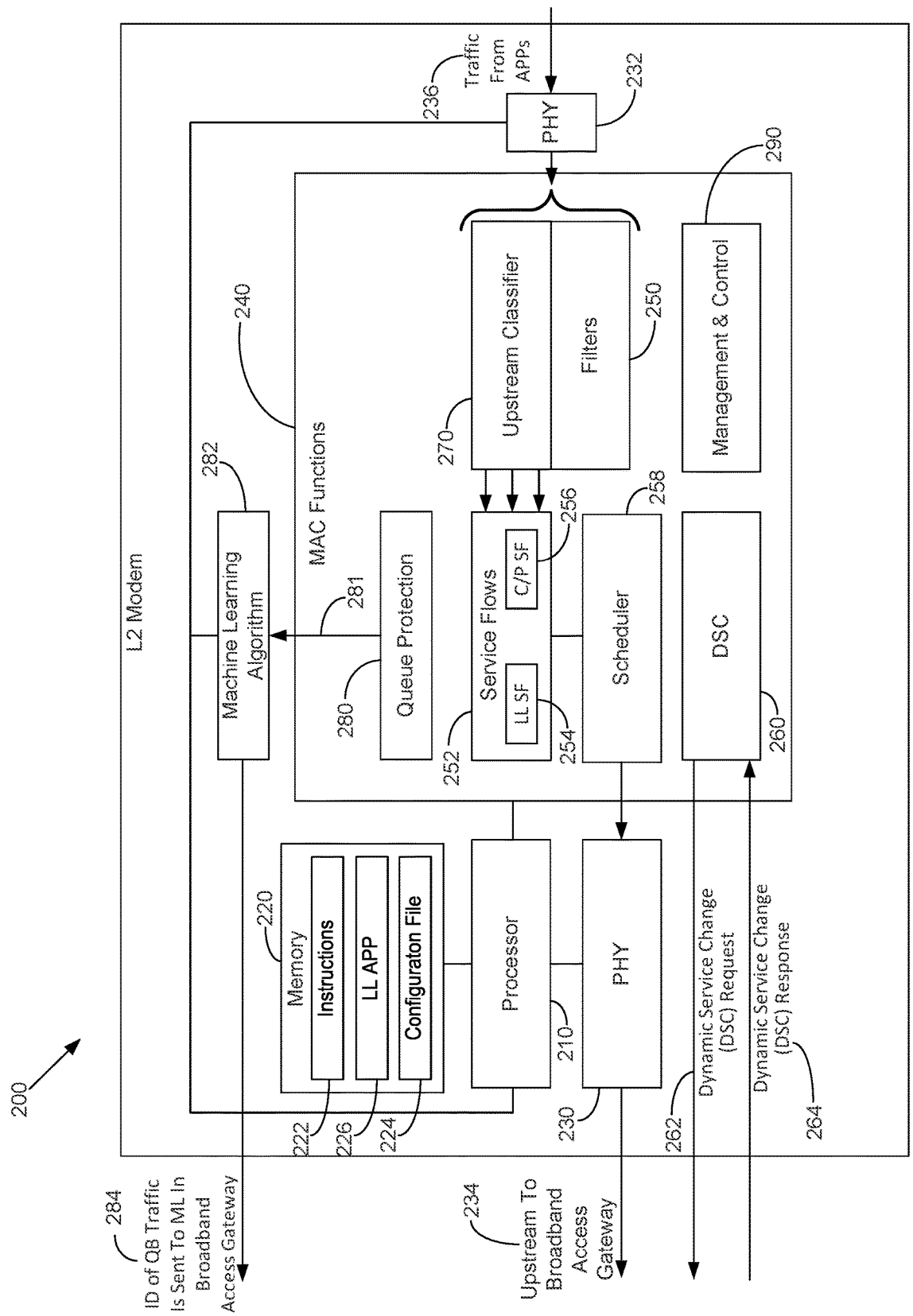
FIG. 2 illustrates a block diagram of a layer 2 (L2) modem.

A detailed description of the exemplary internal components of L2 Modems 120, 122, 124, shown in FIG. 1 will be provided in the discussion of FIG. 2. However, in general, it is contemplated by the present disclosure that Broadband Access Gateway 110, L2 Modems 120, 122, 124, LL Controller Server 140, Network Access Device 150, and Client Devices 160, 162 may include electronic components or electronic computing devices operable to receive, transmit, process, store, and/or manage data and information associated with providing dynamic traffic handling for the L2 Modems 120, 122, 124 that encompasses any suitable processing device adapted to perform computing tasks consistent with the execution of computer-readable instructions stored in a memory or a computer-readable recording medium.

Further, any, all, or some of the computing components in Broadband Access Gateway 110, L2 Modems 120, 122, 124, LL Controller Server 140, Network Access Device 150, and Client Devices 160, 162 may be adapted, where applicable, to execute any operating system, including Linux, UNIX, Windows, MacOS, DOS, and ChromOS as well as virtual machines adapted to virtualize execution of a particular operating system, including customized and proprietary operating systems. Broadband Access Gateway 110, L2 Modems 120, 122, 124, LL Controller Server 140, Network Access Device 150, and Client Devices 160, 162 may be further equipped with components to facilitate communication with other computing devices over the one or more network connections to local and wide area networks, wireless and wired networks, public and private networks, and any other communication network providing dynamic traffic handling for LL service flows.

As mentioned above, and explained in more detail with reference to FIGS. 3-4 below, LL Controller Server 140 is positioned in the cloud and provides, for example, an LL APP 144 to Client Device 150 as LL APP 164, and to L2 Modems 120, 122, 124 as LL APP 132. LL APPs 132, 164 includes a user selectable application traffic filter list, which is used to determine traffic for a LL SF. LL APP 144 and the LL Controller Server 140 work together to provide the selectable application traffic filter list to LL APP 132 and LL APP 164. The classical SF typically hosts most or all traffic from a home network.

Filter 126 is installed in the L2 Modem 120. Filter 126 installed on the L2 Modem 120 checks the incoming traffic for LL SF matches. Different flows come from applications running on Client Devices 160, 162. As traffic passes through the L2 Modem 120, Filter 126 is constantly checking the incoming traffic for a match against LL traffic from ports provided in the application traffic filter lists.

Until a match is identified, the incoming traffic is sent by the classical SF. Once a match is identified, a Dynamic Service Change (DSC) request is sent by DSC messenger 129 to the Broadband Access Gateway 110 to request addition of Classifier 127 to direct LL traffic identified by a 5 tuple to a LL SF. A 5-tuple may include a source IP address, a source port, a destination IP address, a destination port, and identification of the transport being used. Broadband Access Gateway 110 approves the addition, and responds back to L2 Modem 120. The L2 Modem 120 may then install the Classifier 127 locally, so it is able to steer traffic to the LL SF. Thus, as traffic flows, it is filtered by the installed Filters 126 and is further filtered by the Classifier 127 where LL traffic is directed to the LL SF by the added Classifier 127. As mentioned above, L2 Modems 122, 124 may include similar elements and may operate in a manner.

Queue protection (QP) 130 may be used to filter out flows that are queue-building. Such queue-building flows should not be considered LL SFs. QP 130 operates at the input of the LL SFs. For example, there may be 16 queues for LL SFs. Traffic from an application that behaves in a queue-building manner may erroneously be classified into queues for LL SFs, whether accidentally or maliciously. For example, some of the ports may actually carry video streaming footage of a game. Video traffic is queue-building and is latency intolerant. In contrast, mouse clicks/button presses, or any other kind of game feedback/response is LL.

QP 130 monitors the queues and observes how much traffic is coming in and at what rate so the QP 130 can determine whether any traffic is starting to build up in a queue. QP 130 uses a 5 tuple to identify the traffic that is causing a queue to build up traffic. QP 130 directs this traffic from the LL SF to a classical SF.

QP 130 feeds into Machine Learning Algorithm (MLA) 128 this information about a 5 tuples (combinations of source IP address, destination IP address, source port, destination port and the transport protocol in use) that are queue-building. The queue-building traffic is moved to the classical SF. MLA 128 feeds updates to Filter 126 and Classifier 127. Thus, once trained, the MLA 128 indicates which of the various traffic filters of the Classifier 127 should be marked as LL and removed from the Classifier 127. This information is provided by QP 130 to the MLA 128 so the Classifier 127 may be refined, which enables the L2 Modem 120 to perform more effectively when seeing future requests by minimizing the number of incorrect SFs identified by the 5 tuples that are setup as LL SFs. This also allows DSC request that are sent to the LL Broadband Access Gateway 110 to be refined by not including incorrect SFs identified by the 5 tuples in the DSC requests sent to the Broadband Access Gateway 110.

MLA 128 in L2 Modem 120 provides feedback to a global MLA 146 in the LL Controller Server 140. The global MLA 146 in the LL Controller Server 140 learns from all the connected L2 Modems 120, 122, 124. The global MLA 146 in the LL Controller Server 140 is then able to alter the application traffic filter lists provided to future user LL APPs 132, 164. This collaborative feedback from multiple L2 Modems 120, 122, 124 enables the LL Controller Server 140 to improve how to properly identify LL flows for different applications, and reduce the chance of the LL SF from being overwhelmed with LL traffic. This improves the handling of LL SFs by the L2 Modems 120, 122, 124. Using MLA 146, overall LL handling is improved so the Broadband Access Gateway 110 is not continually notified of queue-building traffic because MLA 146 continually updates LL Controller Server 140 of such traffic and the filter list is continually refined. When LL traffic is not received by Classifier 127 for a predetermined period of time, the Classifier 127 may be torn down or removed from the L2 Modems 120, 122, 124. Otherwise, LL traffic is continuously steered to the LL SF by the Classifier 127. Once Classifier 127 is torn down or removed, if LL traffic is once again detected, Classifier 127

(or a different Classifier with different filters) may again be added to the L2 Modems 120, 122, 124 through the DSC process.

FIG. 2 is a block diagram of a layer 2 (L2) Modem 200.

In FIG. 2, a L2 Modem 200 includes Processor 210, Memory 220, PHYs 230, 232, MAC Functions 240 and Machine Learning Algorithm (MLA) 282. PHYs 230, 232 implement physical layer functions to interface physical medium, such as Ethernet, Wi-Fi, etc., with MAC Functions 240 and upper layers. PHY 230 provides packets for upstream service flows 234. PHY 232 receives traffic from applications 236. Processor 210 executes Instructions 222 for implementing PHYs 230, 232 and MAC Functions 240. Memory 220 also stores a Configuration File 224 that is sent to L2 Modem 200 as part of the provisioning process at boot time. Configuration File 224 contains all of the parameters the L2 Modem 200 needs for network access speeds, quality of service, advanced service features, etc. Memory 220 also includes LL APP 226 that is provided by an LL Controller Server. The LL APP 226 identifies LL flows for different applications and provides the selectable application traffic filter list.

The MAC Functions 240 include Filters 250, Service Flows 252, Scheduler 258, DSC 260, Upstream Classifier 270, Queue Protection 280, and Management and Control 290. A user selectable application traffic filter list is provided by the LL APP 226 and Filter 250 checks the traffic for LL SF matches. The Services Flows 252 provides different service Flows (SF) for different traffic types. The different types of traffic are provided to at least a LL SF 254 and a Classic SF 256. Traffic that does not meet the parameters of Filter 250 are provided to a Classic SF 256 of SFs 252. Scheduler 258 determines how many packets from each SF are transmitted.

As traffic passes through the L2 Modem 200, Filters constantly check the traffic for a match against the LL APPs. If no match is determined, the traffic is sent over the Classic SF 256. If a match is identified, a Dynamic Service Change (DSC) Request 262 is triggered at DSC 260 and sent to a Broadband Access Gateway to request addition of Classifier 270 to route such traffic to the LL SF 254. The added Classifier 270 is a traffic filter that is very similar to Filters 250. The DSC Request 262 to add Classifier 270 informs the Broadband Access Gateway to create a special filter for the LL SF 262. The Broadband Access Gateway approves the addition, and sends a DSC Response 264 back to the L2 Modem 200. The L2 Modem 200 then installs that Classifier 270 locally, so it is able to steer traffic to the LL SF 254.

Queue Protection (QP) 280 filter out flows that are queue-building. Such queue-building flows should not be considered LL SFs 254. QP 280 operates at the input of the LL SFs 254. For example, there may be 16 queues for LL SFs 254. Traffic from an application that behaves in a queue-building manner may erroneously be classified into queues for LL SF 254, whether accidentally or maliciously. Some of the ports in the filter list provided by the LL APP 226 may actually carry video streaming footage of a game. Video traffic is queue-building and is latency intolerant. In contrast, mouse clicks/button presses, or any other kind of game feedback/response is LL. QP 280 looks at these queues and observes how much traffic is coming in and at what rate so the QP 280 can determine whether any traffic is starting to build up in the queues. QP 280 uses a 5 tuple to identify the traffic that is causing queues to build up traffic. QP 280 switches this traffic from the LL SF 254 to classical SF 256. QP 280 serves as a way of providing feedback 281 into Machine Learning Algorithm (MLA) 282 about a 5 tuples (combinations of source IP address, destination IP address, source port, destination port and the transport protocol in use) that are queue-building. Classifier 270 is refined by removing the filter for the queue-building traffic, which then will be steered to the Classic SF 256. Once trained, MLA 282 provides an identification of queue-building (QB) traffic 284 and indicates which of the various traffic filters of the Classifier 270 should be marked as LL or not. This feedback 281 from QP 280 into MLA 282 allows the L2 Modem 200 to refine the Classifier 270 and to perform more effectively when seeing future requests by minimizing incorrect traffic for SFs 252 identified by the 5 tuples being setup as LL SFs 254. MLA 282 in the L2 Modem 200 provides the identification of queue-building (QB) traffic 284 to a global MLA in the LL Controller Server, as described in further detail with respect to FIG. 3. The global MLA in the LL Controller Server learns from all the connected L2 Modem 200. The MLA in the LL Controller Server is then able to alter the APP Traffic Filter Lists provided to future LL APPs 226 provided to L2 Modem 200 and to user LL APPs. Management & Control 290 implemented by Processor 210 administers channel access and control of packet transmission, enforces Quality of Service (QoS) policies, etc.

Figure 3:
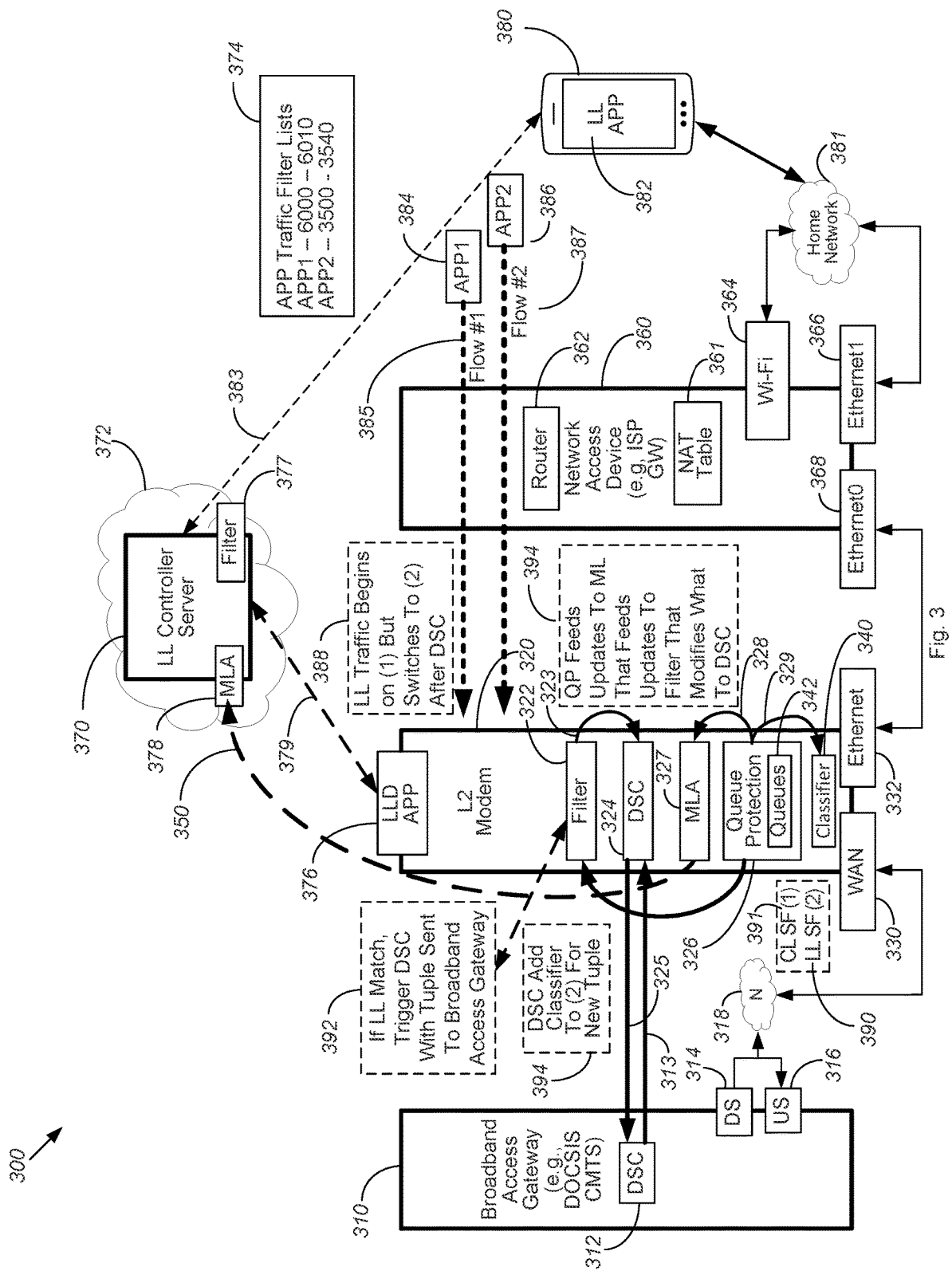
FIG. 3 illustrates operation of a system providing dynamic traffic handling for low latency traffic in a low latency L2 modem.

FIG. 3 illustrates operation of a system 300 providing dynamic traffic handling for low latency traffic in a low latency L2 modem.

In FIG. 3, the system 300 includes Broadband Access Gateway 310, L2 Modem 320, a Network Access Device (e.g., ISP GW) 360 with a NAT Table 361, an LL Controller Server 370, and a Client Device 380 with an LL APP 382. L2 Modem 320 includes Filter 322, DSC Messenger 324, Queue Protection 326, and Machine Learning Algorithm (MLA) 327. Network Access Device 360 may also include Router 362. Broadband Access Gateway 310 also includes DSC Messenger 312. Network Access Device 360 provides Home Network 381 via Wi-Fi 364 and/or Ethernet1 366. Client Device 380 accesses Home Network 381 to connect to Network Access Device 360. LL Controller Server 370 includes Filters 377 and MLA 378. L2 Modem 320 connects with Network Access Device 360 via Ethernet 332 and Ethernet® 368.

L2 Modem 320 connects with Broadband Access Gateway 310 via WAN connection 330 for upstream flows and downstream flows. Broadband Access Gateway 310 includes Downstream (DS) Connection 314 and Upstream (US) Connection 316 to connect with L2 Modem 320 via Network (N) 318.

LL Controller Server 370 is positioned in the Cloud 372 and provides an LL App 382 to Client Device 380 via connection 383 and LL APP 376 to L2 Modem 320 via connection 379, which is a logical connection from LL Controller Server 370 to L2 Modem 320 through Broadband Access Gateway 310. LL APP 376, 382 includes a user selectable APP Traffic Filter List 374, which is used to determine traffic for a LL SF. The User LL APP 382 and the LL Controller Server 370 work together to provide the selectable application traffic filter list. The user choses one of the applications from the user selectable APP Traffic Filter List 374. The LL Controller Server also installs the user selectable APP Traffic Filter List 374 into LL APP 376 in the L2 Modem 320.

Once the LL APP 382 is running, a decision is made to steer certain traffic to a LL SF (2) 390 compared to the classical SF (1) 391. The classical SF (1) 391 typically host most or all traffic from a home network. Filters 322 are installed in the L2 Modem 320. The Filters 322 installed on the L2 Modem 320 check the traffic for LL SF (2) 390 matches. As shown in FIG. 3, two different flows 385, 387 come from application 1 384 and application 2 386. As that traffic flows into L2 Modem 320, it is filtered by the installed Filters 322. As traffic passes through the L2 Modem 320, Filters 322 are constantly checking the traffic for a match against the low latency traffic.

If no match is determined, the traffic is sent over the classical SF (1) 391. If a match is identified 323, a Dynamic Service Change (DSC) Request 325 is triggered 392 by DSC Messenger 324 and sent to the Broadband Access Gateway 310 to request addition of a Classifier 340 to route LL traffic identified by the new tuple 394 to the LL SF (2) 390. DSC Messenger 312 sends a DSC Response 313 to L2 Modem 320 to add Classifier 340. The added Classifier 340 is a traffic filter that is very similar to Filters 322 that were initially installed. At 394 the DSC Request 325 to add Classifier 340 informs the Broadband Access Gateway 310 to create a Classifier 340 with a special filter for the LL SF (2) 390. Broadband Access Gateway 310 approves the addition, and responds back to the L2 Modem 320. The L2 Modem 320 then installs the Classifier 340 locally, so it is able to steer traffic to the LL SF (2) 390. Thus, as traffic flows 387 from application 1 384 and application 2 386, it is filtered by the installed filters and is further filtered by the Classifier 340 and provided to the LL SF (2) 390 by the added LL Classifier 340. As shown at 388, LL traffic begins on Flow #1 385, but switches to Flow #2 387 after the DSC is used to create Classifier 340. Thus, Classifier 340 directs subsequent matching packets to the LL SF (2) 390 resulting in a switchover from the CL SF (1) 391 to the LL SF (2) 390.

APP Traffic Filter List 374 is initially provided to the user LL APP 382 and the LL APP 376 is provided to the L2 Modem 320. However, not all traffic in the list of ports in the APP Traffic Filter List 374 is going to be LL. Some will be data transfer that does not need to be treated as low latency. Queue protection (QP) 326 is used to filter out flows that are queue-building. Such queue-building flows should not be considered LL SFs (2) 390. QP 326 operates at the input of the LL SFs (2) 390. For example, there may be 16 Queues 342 for LL SFs (2) 390. Traffic from an application that behaves in a queue-building manner may erroneously be classified into Queues 342 for LL SFs (2) 390, whether accidentally or maliciously. For example, some of the ports may actually carry video streaming footage of a game. Video traffic is queue-building and is latency intolerant. In contrast, mouse clicks/button presses, or any other kind of game feedback/response is LL.

QP 326 monitors the Queues 342 and observes how much traffic is coming in and at what rate so the QP 326 can determine whether any traffic is starting to build up in Queue 342. QP 326 uses a 5 tuple to identify the traffic that is causing a Queue 342 to build up traffic. QP 326 switches this traffic from the LL SF (2) 390 to a classical SF (1) 391.

QP 326 feeds into MLA 327 this information about a 5 tuples (combinations of source IP address, destination IP address, source port, destination port and the transport protocol in use) that are queue-building. The queue-building traffic is moved to the classical SF (1) 391. MLA 327 feeds updates 328, 329 to Filter 322 and Classifier 340, respectively. Thus, once trained, the MLA 327 indicates which of the various traffic filters of the Classifier 340 should be marked as LL and which traffic filters of the Classifier 340 should be not be marked as LL and thereby removed from the Classifier 340. The feedback 328 from QP 326 into the MLA 327 allows the L2 Modem 320 to refine the APP Traffic Filter Lists 374 so the L2 Modem 320 performs more effectively when seeing future requests by minimizing the number of incorrect SFs identified by the 5 tuples being setup as LL SFs (2) 390, and, as shown at 394, also refines what is included in the DSC Requests 325 sent to the Broadband Access Gateway 310.

MLA 327 in the L2 Modem 320 provides feedback 350 to a global MLA 378 in the LL Controller Server 370. The global MLA 378 in the LL Controller Server 370 learns from all the connected L2 Modems 320. The global MLA 378 in the LLC Controller Server 370 is then able to alter the APP Traffic Filter Lists 374 provided to future user LL APPs 382 and the LL APP 376 provided to L2 Modems 320. This collaborative feedback from multiple L2 Modems 320 enables the LL Controller Server 370 to improve how to properly identify LL flows for different applications, and reduce the chance of the LL SF (2) 390 from being overwhelmed with LL traffic. This improves the handling of LL SFs (2) 390 by the L2 Modem 320 as well as DOCSIS US SG associated with to multiple L2 Modems 320. Using MLA 378, overall LL handling is improved so Broadband Access Gateway 310 is not continually notified of queue-building traffic because MLA 378 continually updates LL Controller Server 370 of such traffic and the APP Traffic Filter List 374 is continually refined. For example, if there are 200 L2 Modems 320 connected to Broadband Access Gateway 310 and to the same DOCSIS US SG, and they all optimize the list of traffic placed into the LL SF (2) 390 as described herein, all the connected L2 devices receive the benefits of the optimization.

QP 326 helps drive the MLA 327 so that when filters are installed in the future, any of ports that have been identified as queue-building will not be included in the filters that are installed at in the future. So any of the ports identified by QP 326 as queue-building, the traffic associated with the ports identified as queue-building will not be associated with the LL SF (2) 390 but will instead be assigned to the classical SFs (1) 391. Thus, the identification of queue-building traffic by QP 326 that is fed into the MLA 327, and filter updating the DSC Messenger 324 that send DSC Requests 325 to Broadband Access Gateway 310 acts as a feedback loop for refining the filter list. If too much traffic is directed to Queues 342 for LL SFs (2) 390, traffic may be dropped. QP 326 helps avoid this condition.

When LL traffic is not received by Classifier 340 for a predetermined period of time, the Classifier 340 may be torn down or removed from L2 Modem 320. Otherwise, LL traffic is continuously steered to the LL SF by the Classifier 340. Once the Classifier 340 is torn down or removed, if LL traffic is again detected, Classifier 340 may again be added to the L2 Modem 320 through the DSC process.

Figure 4:
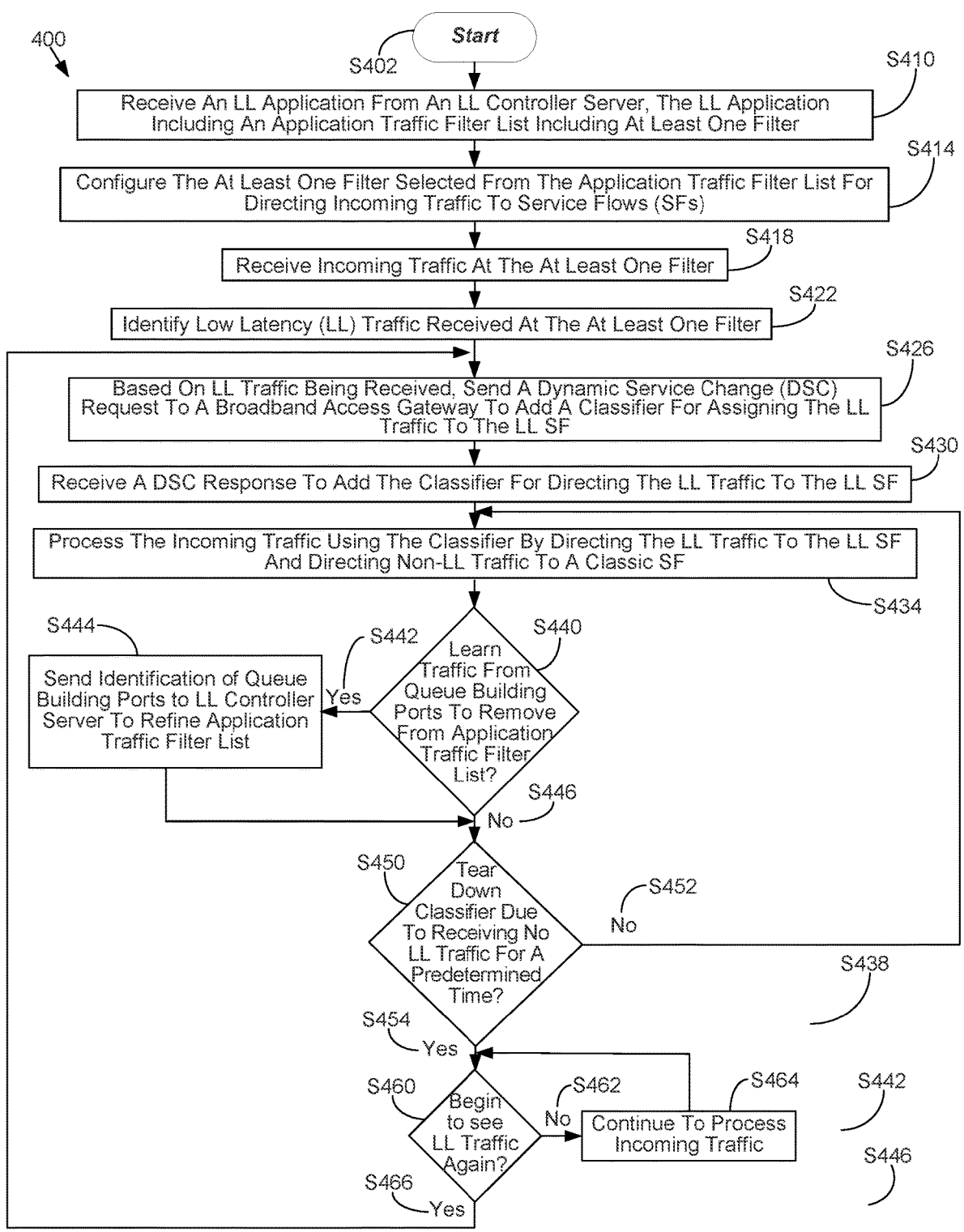
FIG. 4 illustrates a flow chart of a method for providing dynamic traffic handling for low latency traffic in a L2 modem.

FIG. 4 illustrates a flow chart 400 of a method for providing dynamic traffic handling for low latency traffic in a L2 modem.

In FIG. 4, method 400 starts (S402), and an LL Application from an LL Controller Server is received, the LL Application including an Application Traffic Filter List including at least one filter (S410). Referring to FIG. 3, LL Controller Server 370 is positioned in the Cloud 372 and provides an LL APP 382 to Client Device 380 and LL APP 376 to L2 Modem 320. LL APP 376, 382 includes a user selectable application traffic filter list 374, which is used to determine traffic for a LL SF. The User LL APP 382 and the LL Controller Server 370 work together to provide the selectable application traffic filter list. The user choses one of the applications from the user selectable application traffic filter list 374. The LL Controller Server 370 also installs the user selectable application traffic filter list 374 into LL APP in the L2 Modem 320.

The at least one filter selected from the Application Traffic Filter List is configured for directing incoming traffic to Low Latency (LL) Service Flows (SFs) (S414). The user choses one of the applications from the user selectable application traffic filter list 374. The LL Controller Server 370 also installs the user selectable application traffic filter list 374 into LL APP in the L2 Modem 320. Once the LL APP 382 is running, a decision is made to steer certain traffic to a LL SF (2) 390 compared to the classical SF (1) 391.

LL traffic is received at the at least on filter (S418). Referring to FIG. 3, once the LL APP 382 is running, a decision is made to steer certain traffic to a LL SF (2) 390 compared to the classical SF (1) 391. The classical SF (1) 391 typically host most or all traffic from a home network. Filters 322 are installed in the L2 Modem 320. The Filters 322 installed on the L2 Modem 320 check the traffic for LL SF (2) 390 matches. As shown in FIG. 3, two different flows 385, 387 come from application 1 384 and application 2 386. As that traffic flows into L2 Modem 320, it is filtered by the installed Filters 322. As traffic passes through the L2 Modem 320, Filters 322 are constantly checking the traffic for a match against the low latency apps.

The LL traffic received at the at least one filter is identified (S422). Referring to FIG. 3, a match is identified 323.

Based on LL traffic being received by at least one of the first filter and the second filter, a Dynamic Service Change (DSC) Request 325 is sent to a Broadband Access Gateway to add a Classifier for assigning the LL Traffic to the LL SF (S426). Referring to FIG. 3, if a match is identified 323, a Dynamic Service Change (DSC) Request 325 is triggered 392 by DSC Messenger 324 and sent to Broadband Access Gateway 310 to request addition of a Classifier 340 to route LL traffic identified by the new tuple 394 to the LL SF (2) 390.

A DSC Response to add the Classifier for directing the LL traffic to the LL SF is received (S440). Referring to FIG. 3, DSC Messenger 312 sends a DSC Response 313 to L2 Modem 320 to add Classifier 340. The added Classifier 340 is a traffic filter that is very similar to Filters 322 that were initially installed. At 394 the DSC Request 325 to add Classifier 340 informs Broadband Access Gateway 310 to create a Classifier 340 with a special filter for the LL SF (2) 390. Broadband Access Gateway 310 approves the addition, and responds back to the L2 Modem 320. The L2 Modem 320 then installs the Classifier 340 locally, so it is able to steer traffic to the LL SF (2) 390.

The incoming traffic is processed using the Classifier by directing the LL traffic to at least one Queue for the LL SF and directing Non-LL traffic to a Queue for a Classic SF (S434). Referring to FIG. 3, the L2 Modem 320 then installs the Classifier 340 locally, so it is able to steer traffic to the LL SF (2) 390. Thus, as traffic flows 387 from application 1 384 and application 2 386, it is filtered by the installed filters and is further filtered by the Classifier 340 and provided to the LL SF (2) 390 by the added LL Classifier 340.

A determination is made whether the Machine Learning learns what traffic from queue-building ports to remove from application traffic filter list (S440.) Referring to FIG. 3, QP 326 monitors the Queues 342 and observes how much traffic is coming in and at what rate so the QP 326 can determine whether any traffic is starting to build up in Queue 342. QP 326 uses a 5 tuple to identify the traffic that is causing a Queue 342 to build up traffic. QP 326 switches this traffic from the LL SF (2) 390 to a classical SF (1) 391. QP 326 feeds into Machine Learning Algorithm (MLA) 327 this information about a 5 tuples (combinations of source IP address, destination IP address, source port, destination port and the transport protocol in use) that are queue-building.

If yes, (S442), identification of queue-building ports are sent to LL Controller Server to refine the application traffic filter list (S444). The process then returns to the main flow. Referring to FIG. 3, MLA 327 in the L2 Modem 320 provides feedback 350 to a global MLA 378 in the LL Controller Server 370. The global MLA 378 in the LL Controller Server 370 learns from all the connected L2 Modems 320. The global MLA 378 in the LLC Controller Server 370 is then able to alter the APP Traffic Filter Lists 374 provided to future user LL APPs 382 and the LL APP 376 provided to L2 Modems 320. This collaborative feedback from multiple L2 Modems 320 enables the LL Controller Server 370 to improve how to properly identify LL flows for different applications, and reduce the chance of the LL SF (2) 390 from being overwhelmed with LL traffic.

If no (S446), a determination is made whether to tear down the Classifier due to LL Traffic not being received for a predetermined time (S450). Referring to FIG. 3, when LL traffic is not received by Classifier 340 for a predetermined period of time, the Classifier 340 may be torn down or removed from L2 Modem 320.

If no (S452), the classifier continues to process incoming traffic at (S434). Referring again to FIG. 3, Otherwise (Classifier is not torn down or removed), LL traffic is continuously steered to the LL SF by the Classifier 340.

If yes (S454), a determination is made whether LL traffic is seen again (S460). If no (S462), incoming traffic continues to be processed (S464) and continues to look for LL traffic at (S460). If yes (S466), a Classifier is added through the DSC process (S426). Referring to FIG. 3, once the Classifier 340 is torn down or removed, if LL traffic is again detected, Classifier 340 may again be added to the L2 Modem 320 through the DSC process.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

The subject matter of the present disclosure may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions.

Further, the subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A layer 2 (L2) modem, comprising:
a memory storing computer-readable instructions; and
a processor configured to execute the computer-readable instructions to:
receive an application traffic filter list from a low latency (LL) controller server;
configure at least one filter selected from the application traffic filter list;
receive incoming traffic at the at least one filter;
direct the incoming traffic received at the at least one filter to a classic service flow (SF);
identify LL traffic from the incoming traffic received at the at least one filter;
based on identifying the LL traffic received by the at least one filter, send a Dynamic Service Change (DSC) request to a broadband access gateway to add a classifier with one or more LL traffic filters for directing the LL traffic to a LL SF;
receive a DSC response from the broadband access gateway to add the classifier having the one or more LL traffic filters for directing the LL traffic to the LL SF; and
process the incoming traffic using the classifier by determining the incoming traffic that matches parameters of the one or more LL traffic filters and directing the incoming traffic that matches the parameters of the one or more LL traffic filters to the LL SF.

2. The L2 modem of claim 1, wherein the processor receives an LL application description from the LL controller server, the LL application description including the application traffic filter list.

3. The L2 modem of claim 1, wherein the processor is further configured to:

identify the incoming traffic processed by the one or more LL traffic filters of the classifier that begins to buildup in a queue for the LL SF;
determine at least one of the one or more LL traffic filters associated with the incoming traffic that begins to buildup in the queue for the LL SF; and
remove, from the classifier, the at least one of the one or more LL traffic filters associated with the incoming traffic that begins to buildup in the queue for the LL SF.

4. The L2 modem of claim 3, wherein the processor is further configured to send, to the LL controller server, an identification of the at least one of the one or more LL traffic filters associated with the incoming traffic that begins to buildup in the queue for the LL SF to refine the application traffic filter list.

5. The L2 modem of claim 4, wherein the processor implements machine learning to identify a 5-tuple of the incoming traffic determined to match the parameters of the one or more LL traffic filters, wherein the 5-tuple of the incoming traffic determined to match the parameters of the one or more LL traffic filters is used as the identification of the at least one of the one or more LL traffic filters associated with the incoming traffic that begins to buildup in the queue for the LL SF.

6. The L2 modem of claim 1, wherein the processor is further configured to:
determine that the LL traffic has not been received by the classifier for a predetermined time; and
based on determining that the LL traffic has not been received by the classifier for the predetermined time, remove the classifier.

7. The L2 modem of claim 6, wherein the processor is further configured to:
after the classifier has been remove, begin to detect the LL traffic being received at the at least one filter;
based on detecting the LL traffic being received by the at least one filter after the classifier has been removed, send a second Dynamic Service Change (DSC) request to the broadband access gateway to add the classifier with one or more LL traffic filters for directing the LL traffic to the LL SF;
receive a second DSC response from the broadband access gateway to add the classifier having the one or more LL traffic filters for directing the LL traffic to the LL SF; and
process the incoming traffic using the classifier by determining the incoming traffic that matches parameters of the one or more LL traffic filters and directing the incoming traffic that matches the parameters of the one or more LL traffic filters to the LL SF.

8. A method of managing low latency (LL) traffic in a layer 2 (L2) modem, comprising:
receiving, at a L2 modem, a local application traffic filter list from a LL controller server;
configuring, at the L2 modem, at least one filter selected from the local application traffic filter list;
receiving incoming traffic at the at least one filter;
directing, by the L2 modem, the incoming traffic received at the at least one filter to a classic service flow (SF);
identifying LL traffic from the incoming traffic received at the at least one filter;
based on identifying the LL traffic received by the at least one filter, send a Dynamic Service Change (DSC) request from the L2 modem to a broadband access gateway to add to the L2 modem a classifier with one or more LL traffic filters for directing the LL traffic to a LL SF;

receive a DSC response from the broadband access gateway to add to the L2 modem the classifier having the one or more LL traffic filters for directing the LL traffic to the LL SF; and process the incoming traffic using the classifier by determining the incoming traffic that matches parameters of the one or more LL traffic filters and directing the incoming traffic that matches the parameters of the one or more LL traffic filters to the LL SF.

9. The method of claim 8, wherein the receiving, at the L2 modem, the local application traffic filter list further comprises receiving an LL application description from the LL controller server, the LL application description including the application traffic filter list.

10. The method of claim 8 further comprising:
identifying the incoming traffic processed by the one or more LL traffic filters of the classifier that begins to buildup in a queue for the LL SF;
determining at least one of the one or more LL traffic filters associated with the incoming traffic that begins to buildup in the queue for the LL SF; and
removing, from the classifier, the at least one of the one or more LL traffic filters associated with the incoming traffic that begins to buildup in the queue for the LL SF.

11. The method of claim 10 further comprising sending, to the LL controller server, an identification of the at least one of the one or more LL traffic filters associated with the incoming traffic that begins to buildup in the queue for the LL SF to refine the application traffic filter list.

12. The method of claim 11 further comprising processing the incoming traffic using a machine learning algorithm to identify a 5-tuple of the incoming traffic determined to match the parameters of the one or more LL traffic filters, and using the 5-tuple of the incoming traffic determined to match the parameters of the one or more LL traffic filters as the identification of the at least one of the one or more LL traffic filters associated with the incoming traffic that begins to buildup in the queue for the LL SF.

13. The method of claim 8 further comprising
determining that the LL traffic has not been received by the classifier for a predetermined time; and
based on determining that the LL traffic has not been received by the classifier for the predetermined time, removing the classifier.

14. The method of claim 13 further comprising:
after the classifier has been remove, detecting the LL traffic again being received at the at least one filter;
based on detecting the LL traffic again being received by the at least one filter after the classifier has been removed, sending a second Dynamic Service Change (DSC) request to the broadband access gateway to add to the L2 modem the classifier with one or more LL traffic filters for directing the LL traffic to the LL SF;
receiving, at the L2 modem, a second DSC response from the broadband access gateway to add to the L2 modem the classifier having the one or more LL traffic filters for directing the LL traffic to the LL SF; and
processing the incoming traffic using the classifier by determining the incoming traffic that matches parameters of the one or more LL traffic filters and directing the incoming traffic that matches the parameters of the one or more LL traffic filters to the LL SF.

15. A non-transitory computer-readable media having computer-readable instructions stored thereon, which when executed by a processor causes the processor to perform operations comprising:

receiving, at a L2 modem, a local application traffic filter list from a low latency (LL) controller server;
configuring, at the L2 modem, at least one filter selected from the local application traffic filter list;
receiving incoming traffic at the at least one filter;
directing, by the L2 modem, the incoming traffic received at the at least one filter to a classic service flow (SF);
identifying LL traffic from the incoming traffic received at the at least one filter;
based on identifying the LL traffic received by the at least one filter, send a Dynamic Service Change (DSC) request from the L2 modem to a broadband access gateway to add to the L2 modem a classifier with one or more LL traffic filters for directing the LL traffic to a LL SF;
receive a DSC response from the broadband access gateway to add to the L2 modem the classifier having the one or more LL traffic filters for directing the LL traffic to the LL SF; and
process the incoming traffic using the classifier by determining the incoming traffic that matches parameters of the one or more LL traffic filters and directing the incoming traffic that matches the parameters of the one or more LL traffic filters to the LL SF.

16. The non-transitory computer-readable media of claim 15, wherein the receiving, at the L2 modem, a local application traffic filter list further comprises receiving an LL application description from the LL controller server, the LL application description including the application traffic filter list.

17. The non-transitory computer-readable media of claim 15 further comprising:
identifying the incoming traffic processed by the one or more LL traffic filters of the classifier that begins to buildup in a queue for the LL SF;
determining at least one of the one or more LL traffic filters associated with the incoming traffic that begins to buildup in the queue for the LL SF; and
removing, from the classifier, the at least one of the one or more LL traffic filters associated with the incoming traffic that begins to buildup in the queue for the LL SF.

18. The non-transitory computer-readable media of claim 17 further comprising
processing the incoming traffic using a machine learning algorithm to identify a 5-tuple of the incoming traffic determined to match the parameters of the one or more LL traffic filters; and
sending, to the LL controller server, an indication comprising the 5-tuple of the at least one of the one or more LL traffic filters associated with the incoming traffic that begins to buildup in the queue for the LL SF to refine the application traffic filter list.

19. The non-transitory computer-readable media of claim 15 further comprising:
determining that the LL traffic has not been received by the classifier for a predetermined time; and
based on determining that the LL traffic has not been received by the classifier for the predetermined time, removing the classifier.

20. The non-transitory computer-readable media of claim 19 further comprising:
after the classifier has been remove, detecting the LL traffic again being received at the at least one filter;
based on detecting the LL traffic again being received by the at least one filter after the classifier has been removed, sending a second Dynamic Service Change (DSC) request to the broadband access gateway to add to the L2 modem the classifier with one or more LL traffic filters for directing the LL traffic to the LL SF;

receiving, at the L2 modem, a second DSC response from the broadband access gateway to add to the L2 modem the classifier having the one or more LL traffic filters for directing the LL traffic to the LL SF; and processing the incoming traffic using the classifier by determining the incoming traffic that matches parameters of the one or more LL traffic filters and directing the incoming traffic that matches the parameters of the one or more LL traffic filters to the LL SF.

* * * * *